(12) United States Patent
Heyrman et al.

(10) Patent No.: US 10,740,127 B2
(45) Date of Patent: *Aug. 11, 2020

(54) TECHNIQUES FOR UTILIZING A RESOURCE FOLD FACTOR IN PLACEMENT OF PHYSICAL RESOURCES FOR A VIRTUAL MACHINE

(71) Applicant: INTERNATIONAL BUSINESS MACHINES CORPORATION, Armonk, NY (US)

(72) Inventors: Peter Joseph Heyrman, Rochester, MN (US); Bret Ronald Olszewski, Austin, TX (US); Sergio Reyes, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/491,391

(22) Filed: Sep. 19, 2014

(65) Prior Publication Data

US 2015/0363218 A1     Dec. 17, 2015

Related U.S. Application Data

(63) Continuation of application No. 14/306,640, filed on Jun. 17, 2014.

(51) Int. Cl.
 *G06F 9/455* (2018.01)
 *G06F 9/46* (2006.01)
 *G06F 9/50* (2006.01)

(52) U.S. Cl.
 CPC ........ *G06F 9/45558* (2013.01); *G06F 9/5077* (2013.01)

(58) Field of Classification Search
 None
 See application file for complete search history.

(56) References Cited

U.S. PATENT DOCUMENTS

| 6,751,792 | B1 * | 6/2004 | Nair | G06F 8/443 |
| | | | | 717/140 |
| 7,865,686 | B2 | 1/2011 | Akimoto | |
| 8,381,002 | B2 | 2/2013 | Nayar et al. | |
| 8,381,005 | B2 | 2/2013 | Arndt et al. | |
| 8,448,006 | B2 | 5/2013 | Floyd et al. | |
| 8,738,333 | B1 * | 5/2014 | Behera | G06F 9/5061 |
| | | | | 703/2 |
| 2004/0117519 | A1 * | 6/2004 | Smith | G06F 15/17343 |
| | | | | 710/22 |

(Continued)

*Primary Examiner* — Bradley A Teets
(74) *Attorney, Agent, or Firm* — David Quinn; Brian F. Russell (57) ABSTRACT

A technique for assigning physical resources of a data processing system to a virtual machine (VM) includes reading, by a hypervisor executing on the data processing system, a fold factor attribute for the VM. The fold factor attribute defines an anticipated usage of physical resources of the data processing system by the VM. The technique also includes mapping based on a value of the fold factor attribute, by the hypervisor, allocated virtual processors of the VM to the physical resources to maximize processor core access to local memory for ones of the allocated virtual processors that are anticipated to be utilized.

4 Claims, 5 Drawing Sheets

(56) References Cited

U.S. PATENT DOCUMENTS

| | | | |
|---|---|---|---|
| 2009/0158019 A1* | 6/2009 | O'Brien | C07D 213/85 712/245 |
| 2012/0096293 A1* | 4/2012 | Floyd | G06F 1/3206 713/323 |
| 2012/0210331 A1 | 8/2012 | Davidson, II et al. | |
| 2012/0311244 A1 | 12/2012 | Huang et al. | |
| 2013/0243429 A1* | 9/2013 | Whelihan | H04Q 11/00 398/47 |

* cited by examiner

TECHNIQUES FOR UTILIZING A RESOURCE FOLD FACTOR IN PLACEMENT OF PHYSICAL RESOURCES FOR A VIRTUAL MACHINE

This application is a continuation of U.S. patent application Ser. No. 14/306,640 entitled "TECHNIQUES FOR UTILIZING A RESOURCE FOLD FACTOR IN PLACEMENT OF PHYSICAL RESOURCES FOR A VIRTUAL MACHINE," filed on Jun. 17, 2014, the disclosure of which is incorporated herein by reference in its entirety for all purposes.

BACKGROUND

The disclosure is generally directed to placement of physical resources for a virtual machine and, more particularly, to techniques for utilizing a resource fold factor in placement of physical resources for a virtual machine.

Computing may be thought of in terms of an application and a supporting platform. A supporting platform typically includes a hardware infrastructure of one or more processor cores, input/output, memory, and fixed storage (the combination of which supports an operating system (OS), which in turn supports one or more applications). Applications may be thought of as self-contained bundles of logic that rely on core object files and related resource files. As computing has become integral to modern industry, applications have become co-dependent on the presence of other applications. That is, a requisite environment for an application may include not only an underlying OS and supporting hardware platform, but also other key applications.

Key applications may include application servers, database management servers, collaboration servers, and communicative logic commonly referred to as middleware. Given the complexity of application and platform interoperability, different combinations of applications executing in a single hardware platform can demonstrate differing degrees of performance and stability. Virtualization technology interjects a layer between a supporting platform and executing applications. From the perspective of business continuity and disaster recovery, virtualization provides the inherent advantage of environment portability. For example, moving an entire environment configured with multiple different applications may be as simple as moving a virtual image from one supporting hardware platform to another.

In general, more powerful computing environments can support the coexistence of multiple different virtual images while maintaining a virtual separation between the images. Consequently, a failure condition in one virtual image typically cannot jeopardize the integrity of other co-executing virtual images in the same hardware platform. A virtual machine monitor (VMM) or hypervisor manages the interaction between each virtual image and underlying resources provided by a hardware platform. A bare metal hypervisor runs directly on the hardware platform similar to how an OS runs directly on hardware. In contrast, a hosted hypervisor runs within a host OS. In either case, a hypervisor can support the operation of different guest OS images or virtual machine (VM) images. The number of VM images is limited only by the processing resources of a VM container that holds the VM images or the hardware platform.

Virtualization has proven especially useful for end-users that require separate computing environments for different types of applications that are deployed on a single hardware platform. For example, a primary OS native to one type of hardware platform may provide a virtualized guest OS that is native to a different hardware platform (so that applications requiring the presence of the guest OS can co-exist with other applications requiring the presence of the primary OS). In this case, an end-user is not required to provide separate computing environments to support different types of applications. That is, irrespective of the guest OS, access to underlying resources of the single hardware platform remains static.

Virtualized environments have been deployed to aggregate different interdependent applications in different VMs in composing application solutions. For example, an application server can execute within one VM while a database management server executes in a different VM and a web server executes in yet another VM. Each of the VMs can be communicatively coupled to one another in a secure network and any given deployment of the applications can be live migrated to a different deployment without interfering with the execution of the other applications in the other VMs. In a typical live migration, a VM can be moved from one host server to another host server in order to, for example, permit server maintenance or to permit an improvement in hardware support for the VM.

Entitled capacity (EC) defines the minimum physical processor resources a logical partition (LPAR) or virtual machine (VM) is entitled to utilize. EC and virtual processors (VPs) are frequently utilized in conjunction with virtual machines (VMs) that employ a shared processor pool. A VP may, for example, represent from one-tenth of a physical processor core to one physical processor core. For example, if one VP is defined for a VM, the VP can physically utilize up to one physical processor core. As another example, if three VPs are defined for a VM, the three VPs can physically utilize no more than three physical processor cores. In a virtualized data processing system that employs simultaneous multithreading (SMT) with a maximum of four SMT threads, one VP may appear as up to four logical processors in a VM depending on the SMT mode. As mentioned above, EC corresponds to the physical processor resources that are assigned to a VM. In various virtualized data processing systems, when a VM is uncapped, the VM can utilize excess cycles in a shared processor pool, which may allow the VM to exceed an assigned EC. It should be appreciated that capping an EC of a VM limits the amount of physical processor resources the VM can utilize.

Processor utilization by a VM may also be limited by restricting a number of VPs that may be assigned to the VM. For example, if a VM is assigned four VPs and 1.6 processing units, 0.4 processing units may be allocated to each VP. With a highly threaded workload, the assignment of four VPs and 1.6 processing units to a VM might be optimal. As another example, if two VPs and 0.6 processing units are assigned to a VM, each VP may be allocated 0.3 physical processor cores.

BRIEF SUMMARY

A technique for assigning physical resources of a data processing system to a virtual machine (VM) includes reading, by a hypervisor executing on the data processing system, a fold factor attribute for the VM. The fold factor attribute defines an anticipated usage of physical resources of the data processing system by the VM. The technique also includes mapping based on a value of the fold factor attribute, by the hypervisor, allocated virtual processors of the VM to the physical resources to maximize processor core access to local memory for ones of the allocated virtual processors that are anticipated to be utilized.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a processor configured to utilize one or more resource fold factors in the placement of physical resources for a virtual machine.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements. As may be used herein, the term 'system memory' is synonymous with the term 'main memory' and does not include 'cache' or 'cache memory'.

When processor virtualization is implemented in a data processing system, physical resources (e.g., processors, memory, and input/output (I/O)) for a logical partition (LPAR) or virtual machine (VM) are typically 'placed' by a virtual machine manager (VMM) or hypervisor to optimize locality. For example, if a VM is started with two virtual processors (VPs) and 16 GB of memory, the two VPs are generally assigned to two respective processor cores on a same processor chip that has 16 GB of available physical memory that is local to the processor cores. It should be appreciated that placement does not restrict the processor cores that VPs may execute upon when a VM operates above an entitlement level. However, processor execution for a VM up to an entitlement level tends to be local to resource assignment. While placement of resources can be dynamic over time (i.e., processor and memory placement may be moved), movement of resource placement is usually resource intensive and, as such, is not overly dynamic with respect to time.

Conventionally, customers have utilized entitled capacity (EC) and/or VPs to meet perceived needs. To minimize costs, customers may set an associated EC relatively low and set associated VPs relatively high to allow for maximum/peak consumption to account for any potential peak workloads. In this case, a hypervisor may either pack physical resource assignment too tightly for a VM based on an EC setting (e.g., assign all VPs to a same processor chip) or spread out physical resource assignment too much based on VPs (e.g., assign VPs to multiple processor chips). For example, defining too many VPs to account for a spike in a workload (that may or may not occur) may lead to inefficient locality placement of physical resources for typical usage.

As VMs are created that utilize ECs and VPs, a hypervisor is responsible for mapping VMs to physical processor cores and physical memory while maximizing locality (e.g., map VPs to processor cores and memory on a same processor chip) for optimal performance. Performance degradation occurs the further a processor core and associated memory reside from one another. A one-size-fits-all conventional solution for mapping VMs to physical processor cores and physical memory is increasingly unworkable, as multiple VPs are supported by each physical processor core. Moreover, VM mobility further complicates mapping VMs to physical processor cores and physical memory. When a data processing system begins to exhaust physical resources, a hypervisor may begin fragmenting resources when mapping VMs to physical processor cores and physical memory (e.g., map multiple VPs of different VMs to a same processor core), which can lead to further performance issues.

According to the present disclosure, a processor fold factor attribute and/or a memory fold factor attribute may be added to a profile (or definition) of a VM to aid a hypervisor in assigning resources to the VM. In one or more embodiments, a user of a VM may specify a percentage for anticipated physical resource consumption for the fold factor attribute or attributes. The fold factor attribute may then be utilized by a hypervisor when mapping resources to improve performance for normal workloads (i.e., workloads that substantially conform to the fold factor attribute(s)).

In general, the performance of a VM and the aggregate performance of VMs of a virtualized data processing system are optimized when VPs of the VMs are placed in a way to maximize processor core access to local memory. To improve locality, it is usually desirable to reduce the number of VPs from various VMs that are assigned to a particular processor core to the minimum required. Reducing the number of VPs from various VMs that are assigned to a particular processor core tends to result in a round-robin policy of VP placement, as VMs are started (as long as memory capacity is not a factor). However, the round-robin policy of VP placement is not particularly desirable when some VMs are created with a peak capacity that is much higher than an anticipated usage (e.g., a VM is created with eight VPs when typical usage is two VPs). As an example, assuming that a VM is created with ten VPs and the VM only has a typical usage of one VP, a mapping of nine normally unused VPs is made. Mapping nine normally unused VPs for a VM may increase contention to physical resources for other VMs. Additionally, creating VM mappings that go beyond typical usage may cause a hypervisor to spread resource allocation over more processor cores (e.g., processor cores on different chips or in different multi-chip modules (MCMs)) than is required, which can result in allocated memory being less local.

As one example, a VM with 64 GB of memory and ten VPs that are allocated on a virtualized data processing system with eight processor cores per processor chip will usually have processor resources that span processor chips. Additionally, since it is usually undesirable to have VPs on chips without allocated memory, the memory is likely to be spread between chips. For example, a mapping for a VM with 64 GB of memory and ten VPs may be assigned to two processor chips as follows: processor chip0 may have a home memory of 32 GB and five VPs (i.e., VP0-VP4); and processor chip1 may have a home memory of 32 GB and five VPs (i.e., VP5-VP9). In this case, the 64 GB of memory is spread across two processor chips (i.e., processor chip0 and processor chip1). In the event that VP0 is the only VP operating on processor chip0 and no VP is operating on processor chip1, VP0 will likely use memory associated with chip1, which may reduce overall locality.

According to one or more embodiments of the present disclosure, additional attributes (i.e., a fold factor attributes) associated with a VM are implemented that define a processor fold factor and a memory fold factor. A processor fold factor attribute may define a percentage of the physical resources that a VM should be optimized around. For example, in the ten VP case where all VPs are assigned to processor chip0, a ten percent processor fold factor implies the following allocation: processor chip0 is allocated a home memory of 64 GB with VP0 mostly running and VP1-VP9 mostly idle.

It should be appreciated that the above allocation may be suboptimal if the VM attempts to use all allocated VPs, as the allocated VPs would contend with processor and memory resources on the single processor chip (i.e., chip0). In that case, some of the VPs would typically be eventually reassigned (i.e., floated) to other processor chips. In general, floating VPs of a VM onto other processor chips may not cause a VM to utilize more processor resources, but may reduce efficiency of the VM. It should be appreciated that implementing a memory fold factor functions similar to a processor fold factor. However, a memory fold factor may only be particularly useful when memory usage by VPs is relatively independent of each other (e.g., memory is not heavily shared between VPs).

In summation, according to aspects of the present disclosure, an attribute for a VM that provides a hint (to a hypervisor) of a typical physical resource usage for the VM is implemented to facilitate VP and memory placement. The physical resource usage may, for example, be based on historical usage of physical resources by an application or applications executed by the VM. As noted above, hypervisors are responsible for management and placement of VM resources (i.e., VPs and memory). As previously alluded to, performance degradation is typically experienced when processors and memory utilized by VMs reside in separate physical domains (e.g., different nodes). According to various embodiments, the locality issue is addressed by providing one or more additional VM attributes (i.e., fold factor attributes) to assist a hypervisor in making placement decisions.

Figure 1:
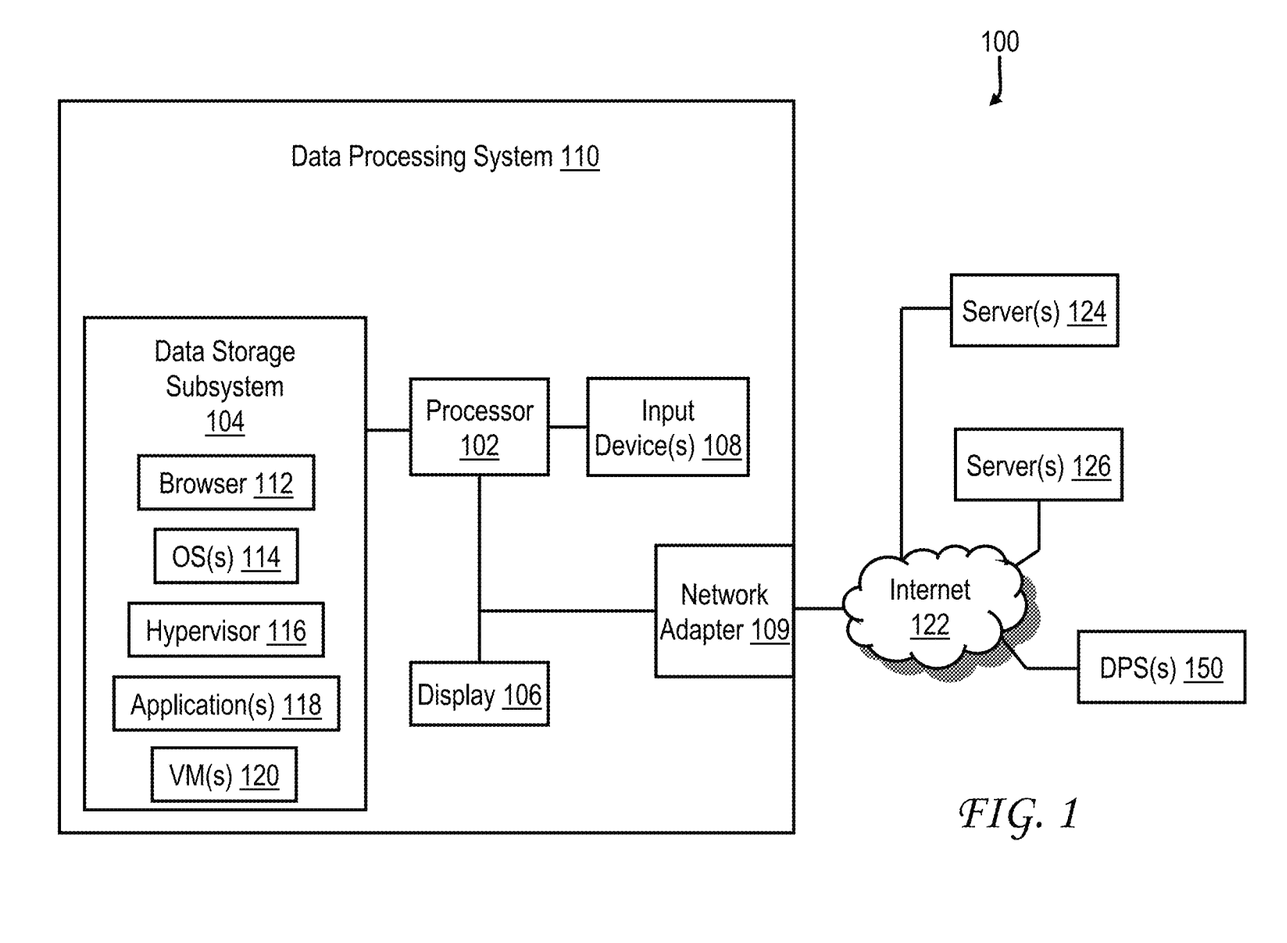
FIG. 1 is a diagram of a relevant portion of an exemplary data processing system environment that is configured to utilize a resource fold factor in placement of physical resources for a virtual machine, according to the present disclosure.

With reference to FIG. 1, an exemplary data processing environment 100 is illustrated that includes a data processing system 110 that is configured, according to one or more embodiments of the present disclosure, to utilize one or more fold factors in the placement of physical resources for a virtual machine. Data processing system 110 may take various forms, such as workstations, laptop computer systems, notebook computer systems, desktop computer systems or servers and/or clusters thereof. Data processing system 110 includes one or more processing units or processors 102 (each of which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 may also include application programs, such as a browser 112 (which may optionally include customized plug-ins to support various client applications), a hypervisor (or virtual machine monitor (VMM)) 116 for managing one or more virtual machines (VMs) 120 as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems (DPSs) 150 that are configured in a similar manner as data processing system 110. In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
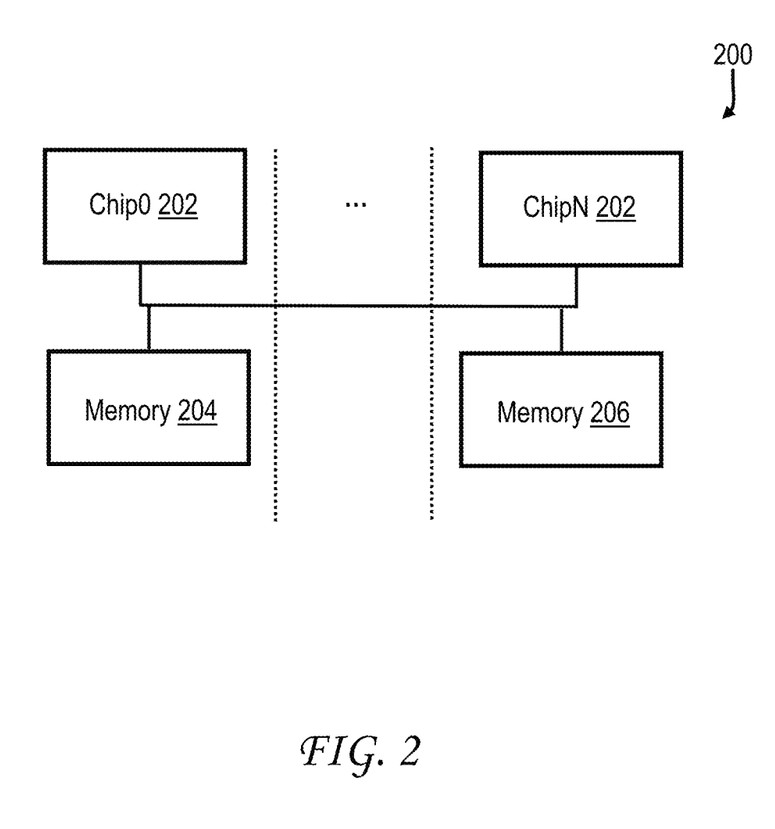
FIG. 2 is a diagram of a relevant portion of another data processing system that is configured to utilize a resource fold factor in placement of physical resources for a virtual machine, according to the present disclosure.

With reference to FIG. 2, relevant portion of a virtualized data processing system (DPS) 200, configured according to am embodiment of the present disclosure, is illustrated. DPS 200 includes multiple processor chips (labeled 'chip0' through 'chipN') 202 each of which include multiple processor cores and may include a level 1 (L1) instruction cache that is coupled to one or more other cache levels (e.g., level 2 (L2) and level 3 (L3) caches) that may be, for example, implemented in data storage subsystem 104. As is illustrated in FIG. 2, chips 202 are coupled to shared memories 204 and 206. Memory 204 may, for example be a 128 GB memory and memory 206 may be, for example, a 32 GB memory. As is illustrated, memory 204 is located physically closer to chip0 and memory 206 is located physically closed to chipN. Assuming that a VM with 128 GB of memory and twelve VPs is allocated to be executed on DPS 200 and that each chip 202 includes eight processor cores per processor chip 202, the VM will usually have processor resources that span multiple processor chips 202.

As noted above, since it is usually undesirable to have VPs on processor chips without allocated memory, memory assignment is also likely to be spread between chips 202. For example, a mapping for a VM with 128 GB of memory and twelve VPs may be assigned to two processor chips 202 as follows: processor chip0 may have a home memory of 64 GB and six VPs (i.e., VP0-VP5); and processor chip1 (not specifically shown) may have a home memory of 64 GB and six VPs (i.e., VP6-VP11). In the event that VP0 is the only VP operating on processor chip0 and no VP is operating on processor chip1, VP0 will likely use memory associated with chip1 (not specifically shown), which will reduce overall locality. In this case, the 128 GB of memory is spread across two processor chips (e.g., processor chip0 and processor chip1).

Alternatively, hypervisor 116 may choose memory 204 to supply the 128 GB of memory to processor chip0 and processor chip1 and in this case, VP0 will have available local memory. For example, according to the present disclosure, hypervisor 116 may utilize a processor fold factor, that defines the percentage of physical resources that a VM should be optimized around, to determine how to allocate resources. For example, when a VM has twelve VPs and an 8.33 percent processor fold factor, hypervisor 116 should assign all twelve of the VPs to a single processor chip and all of the memory associated with the single processor chip to the VM. That is, hypervisor 116 may assign all twelve of the VPs to processor chip0 and allocate a home memory of 128 GB (provided by memory 204) to processor chip0, as VP0 is mostly running and VP1-VP11 are mostly idle. In this case, one or more of VP1-VP11 may be assigned less than one processor core. A fold factor may be determined in a number of ways. For example, a processor fold factor and a memory fold factor for a VM may be determined by running a workload associated with the VM and monitoring resource utilization or by using various planning tools. It should be appreciated that VP usage of processor cores may not be correlated to memory usage. For example, a processor that runs a database may have a relatively high memory usage and a relatively low processor core usage.

Figure 3:
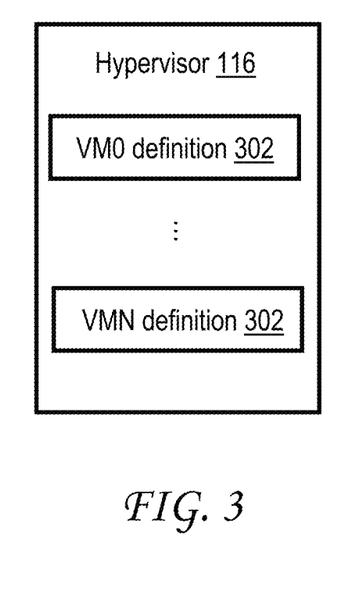
FIG. 3 is a diagram that depicts a hypervisor that includes multiple virtual machine definitions that each include one or more fold factors that are utilized by the hypervisor in the placement of physical resources for associated virtual machines, according to the present disclosure.

With reference to FIG. 3, hypervisor 116 is illustrated as maintaining VM definitions 302 for each instantiated VM. As noted above, VM definitions 302 may include a processor fold factor and/or a memory fold factor according to the present disclosure, among other attributes. Alternatively, VM definitions 302 be stored in a location accessible to hypervisor 116, but not within hypervisor 116.

Figure 4:
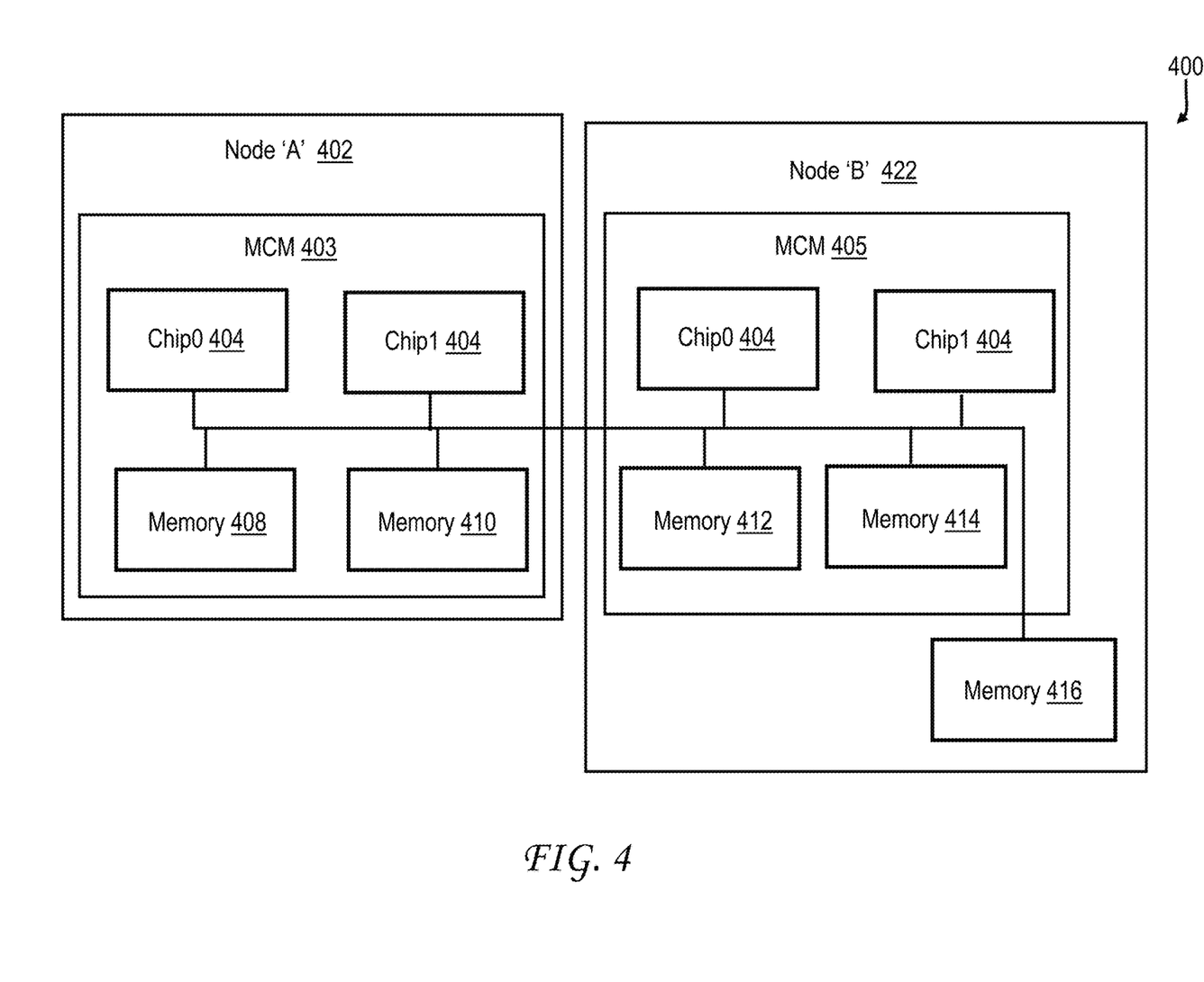
FIG. 4 is a diagram of a relevant portion of yet another data processing system that is configured to utilize a resource fold factor in placement of physical resources for a virtual machine, according to the present disclosure.

With reference to FIG. 4, an exemplary data processing system 400 is depicted that includes two nodes 402 and 422. Node 402 includes a multi-chip module (MCM) 403 that includes two processor chips 404 and shared memory 408 and 410. As is illustrated, memory 408 is local to chip0 of MCM 403 and memory 410 is local to chip1 of MCM 403. Both memory 408 and 410 are local to node 402. Node 422 includes a multi-chip module (MCM) 405 that includes two processor chips 404 and shared memory 412 and 414. As is illustrated, memory 412 is local to chip0 of MCM 405 and memory 414 is local to chip1 of MCM 405. Node 422 also include a memory 416 that is located off MCM 405 and is located closer to chip1 of MCM 405 than chip0 of MCM 405. As is shown, memories 412, 414, and 416 are all local to node 422. Processor chips 404 may, for example, each include eight processor cores.

Assuming memory 408 is a 32 GB memory, memory 410 is a 16 GB memory, memory 412 is a 64 GB memory, memory 414 is a 64 BG memory, memory 416 is a 128 GB memory, a VM has twenty VPs that require 196 GB of memory, an eighty percent processor fold factor is defined for the VM, and a ninety percent memory fold factor is defined for the VM, hypervisor 116 may assign ten VPs to chip0 of MCM 405 and ten VPs to chip1 of MCM 405 based on the availability of memory on node 422 and the memory and processor fold factors. That is, in order to localize memory for the twenty VPs (sixteen of which VPs are utilized most of the time and four of which VPs are idle most of the time) hypervisor 116 may assign all of the VPs to node 422 based on the processor and memory fold factors defined for the VM and available memory on node 422. As noted above, processor and memory fold factors for a VM may be determined by running a workload associated with the VM and monitoring resource utilization or by using various planning tools.

Figure 5:
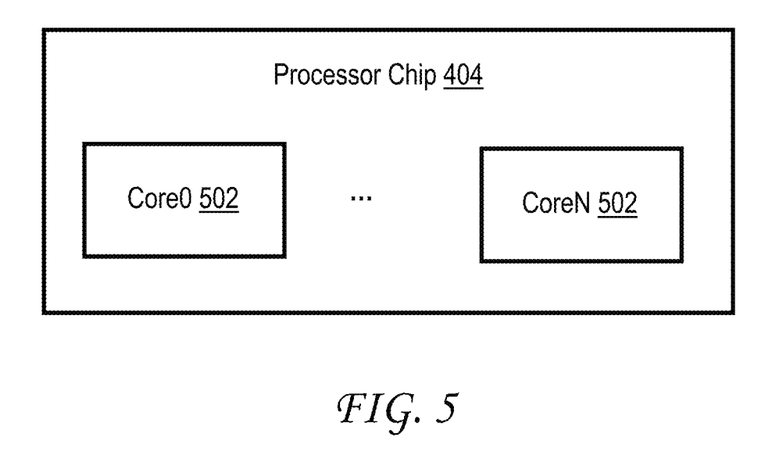
FIG. 5 is a diagram of exemplary processor chip that includes a plurality (e.g., eight) processor cores.

With reference to FIG. 5, processor chip 404 is illustrated as including 'N' processor cores. It should be appreciated that a processor chip utilized in conjunction with the resource fold factor techniques disclosed herein may include more or less than eight cores.

Figure 6:
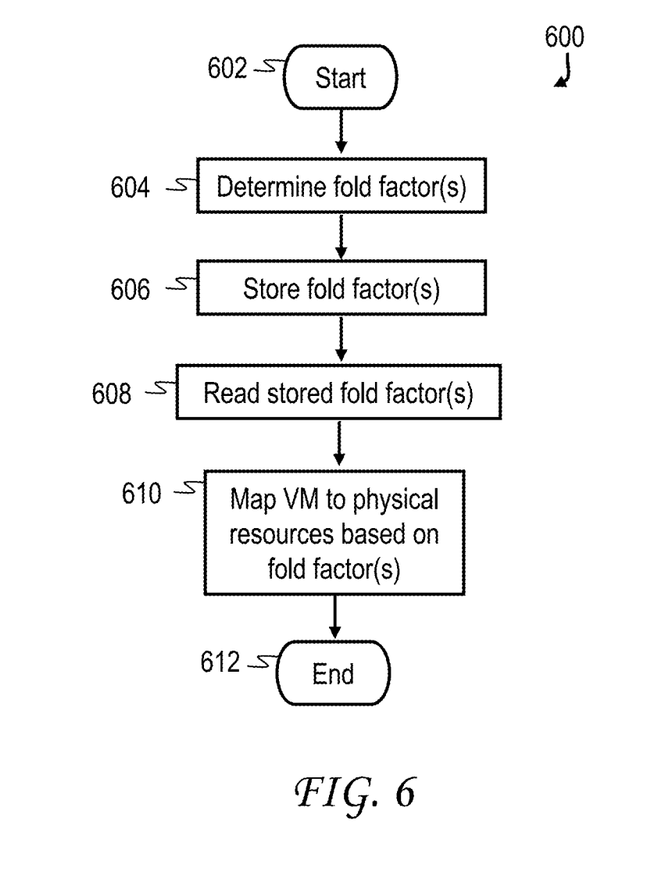
FIG. 6 is a flowchart of an exemplary process that employs a resource fold factor in the placement of physical resources for a virtual machine, according to the present disclosure.

With reference to FIG. 6, an exemplary placement process 600 is illustrated that is executed by processor 102, for example, each time a VM is instantiated. Process 600 is initiated in block 602, at which point control transfers to block 604. In block 604, processor 102 determines one or more fold factors for a VM that is to be instantiated. For example, processor 102 may receive input from a user of the VM or may monitor resource utilization for the VM or utilize various planning tools to determine processor and memory fold factors for the VM. Next, in block 606, processor 102 stores the fold factors in a VM definition 302 (e.g., in a file or data structure) for the VM. For example, the VM definition may be stored within hypervisor 116 or in a location that is accessible to hypervisor 116. Then, in block 608, hypervisor 116 reads the one or more stored fold factors. Next, in block 610, hypervisor 116 maps the VM to physical resources based on the one or more fold factors.

For example, assuming memory 408 is a 16 GB memory, memory 410 is a 16 GB memory, memory 412 is a 64 GB memory, memory 414 is a 64 BG memory, memory 416 is a 128 GB memory, a VM has twenty VPs that require 32 GB of memory, an eighty percent processor fold factor is defined for the VM, and a seventy percent memory fold factor is defined for the VM, hypervisor 116 may assign ten VPs to chip0 of MCM 403 and ten VPs to chip1 of MCM 403 based on the availability of memory on node 402 and the memory and processor fold factors. That is, in order to localize memory for the twenty VPs (sixteen of which VPs are utilized most of the time and four of which VPs are idle most of the time) and provide capacity for a larger workload on node 422, hypervisor 116 may assign all of the VPs to node 402 based on the processor and memory fold factors defined for the VM and available memory on node 402. Following block 610 control transfers to block 612, where process 600 terminates until, for example, a next VM is instantiated.

Accordingly, techniques have been disclosed herein that advantageously utilize one or more resource fold factors in the placement of physical resources for a virtual machine.

In the flow charts above, the methods depicted in FIG. 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of assigning physical resources of a data processing system to a virtual machine, comprising:
   in response to a virtual machine (VM) being instantiated, reading, by a hypervisor executing on a data processing system, a fold factor attribute for the VM, wherein the fold factor attribute defines a user specified anticipated usage of physical resources of the data processing system by the VM; and
   mapping based on a value of the fold factor attribute, by the hypervisor, allocated virtual processors of the VM to the physical resources such that processor core access to local memory that is not located within a processor is maximized for ones of the allocated virtual processors that are anticipated to be utilized, wherein the fold factor attribute includes a processor fold factor attribute that defines a percentage of the allocated virtual processors of the VM that are anticipated to be utilized and a memory fold factor attribute that defines a percentage of required memory of the VM that is anticipated to be utilized.

2. The method of claim 1, wherein the physical resources include multiple processor cores.

3. The method of claim 2, wherein the physical resources include respective local memory associated with each of the multiple processor cores.

4. The method of claim 1, wherein the physical resources include multiple processor cores, memory, and input/output (I/O).

* * * * *